United States Patent [19]

Wiese

[11] 4,323,255
[45] Apr. 6, 1982

[54] MECHANICAL SEAL WITH ECCENTRIC SEAL FACES

[75] Inventor: Winfred J. Wiese, Los Angeles, Calif.

[73] Assignee: Borg-Warner Corporation, Chicago, Ill.

[21] Appl. No.: 65,784

[22] Filed: Aug. 13, 1979

[51] Int. Cl.³ .............................................. F16J 15/34
[52] U.S. Cl. ................................. 277/81 R; 277/65; 277/83; 277/96.1
[58] Field of Search .................. 277/81 R, 38, 65, 83, 277/96, 96.1, 96.2

[56] References Cited

U.S. PATENT DOCUMENTS

| 2,586,739 | 2/1952 | Summers. | |
|---|---|---|---|
| 2,884,268 | 4/1959 | Amirault et al.. | |
| 2,912,265 | 11/1959 | Brummer. | |
| 3,035,841 | 5/1962 | Riester | 277/3 |
| 3,499,653 | 3/1970 | Gardner | 277/83 X |
| 4,266,786 | 5/1981 | Wiese | 277/83 X |

FOREIGN PATENT DOCUMENTS

| 2226796 | 6/1973 | Fed. Rep. of Germany | 277/65 |
|---|---|---|---|
| 121876 | 11/1927 | Switzerland | 277/96.1 |
| 690569 | 4/1953 | United Kingdom | 277/96.1 |
| 735250 | 8/1955 | United Kingdom | 277/96.1 |
| 847720 | 9/1960 | United Kingdom | 277/96.1 |
| 421834 | 11/1974 | U.S.S.R. | 277/96.1 |

*Primary Examiner*—Robert S. Ward, Jr.
*Attorney, Agent, or Firm*—Aubrey L. Burgess

[57] ABSTRACT

A mechanical seal assembly adapted to be associated with a rotatable shaft and a housing and having three seal rings, one connected to the shaft and thus rotatable, another connected to the housing and thus stationary, and the third or center intermediate the rotatable and the stationary seal rings. The center seal ring has spaced faces each engaging an adjacent face of the adjacent ring. The center or intermediate seal ring has its seal faces defined by circular boundaries radially offset from one another and from the axial center of the assembly. In other words, the seal faces of the center ring eccentric to one another and each is eccentric to the contact face of the adjacent ring.

3 Claims, 3 Drawing Figures

MECHANICAL SEAL WITH ECCENTRIC SEAL FACES

BACKGROUND OF THE INVENTION

Conventional mechanical seals are used to separate different fluids and comprise a rotatable seal ring rotationally connected to a rotatable shaft with a seal face engaging a seal face of a stationary seal ring connected to a housing and the like, one or both of the seal rings being axially movable and being resiliently urged toward one another so to insure seal face engagements. Distortion of the seal ring support, either shaft or housing which occurs primarily because of temperature considerations as transmitted to the seal rings causing distortion of the seal rings and malfunction of the seal. Wearing of the seal faces can be expected because of the speed of rotation therebetween which can become severe in high speed applications.

THE INVENTION

According to the invention, there is disclosed a mechanical seal assembly comprising a rotatable seal ring, a stationary seal ring and an intermediate floating or central seal ring, the latter having spaced seal faces one of which engages the seal face on the rotatable seal ring and the other of which engages the seal face on the stationary seal ring. The central seal ring is centered by the housing yet is free to rotate, the housing forming a bearing therefor. One of the important features of this invention is the eccentric seal faces of the central seal ring; the faces are eccentric to one another and also to the axial center of the assembly. Thus, the seal faces of the central ring may operate as rotating faces or as stationary faces or as rotating faces with rotational speeds differing from that of the shaft depending upon the differential friction existing at any time between the contacting seal faces.

THE DRAWINGS

DETAILED DESCRIPTION

Figure 1:
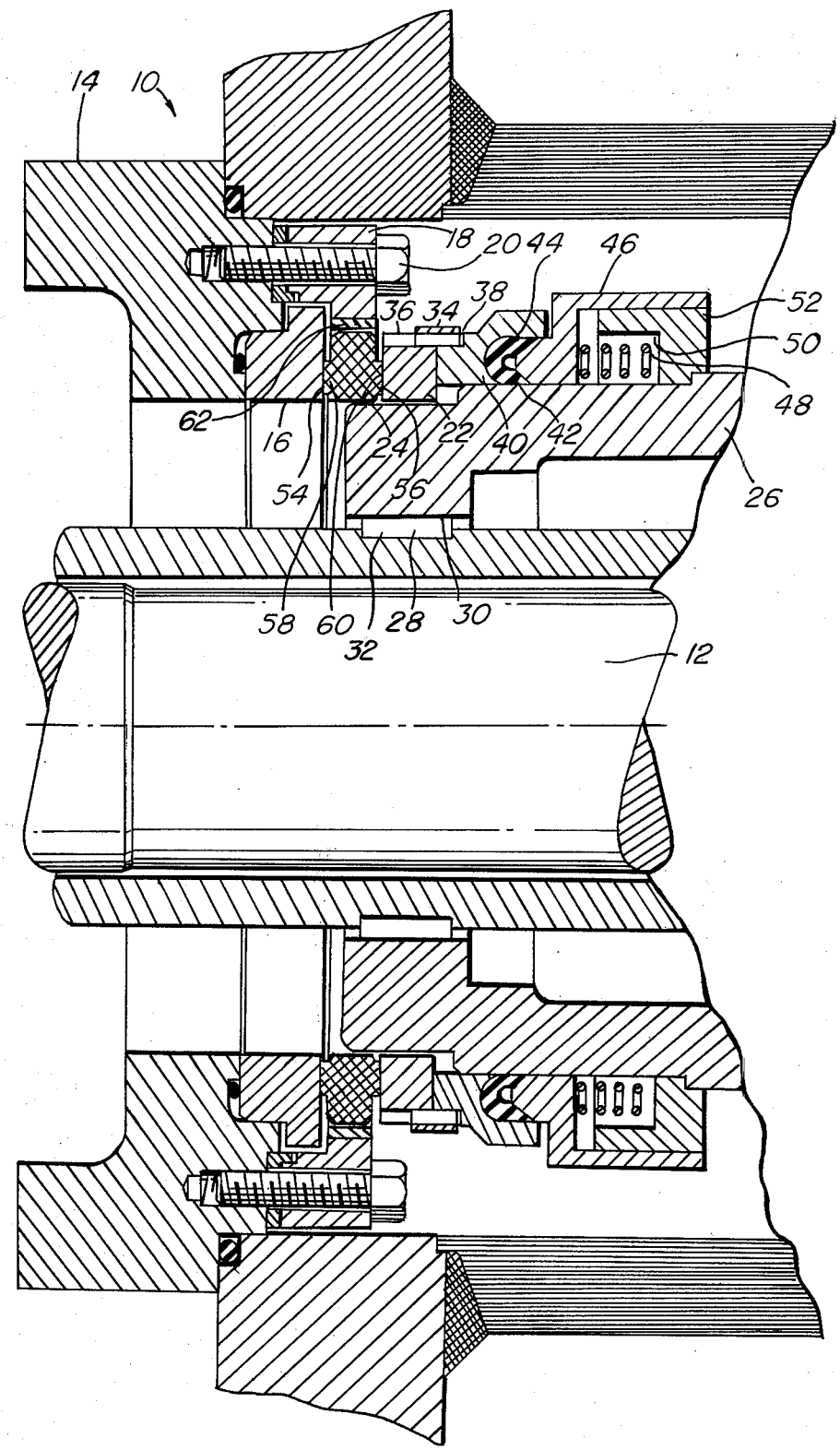
FIG. 1 is a sectional view of one embodiment of the invention.

Looking now at FIG. 1, there is illustrated a mechanical seal assembly 10 associated with a rotatable shaft 12 and a multiple part stationary housing 14. The seal assembly 10 comprises a stationary seal ring 16 connected by a flanged ring 18 and bolts 20 to the housing 14, a rotatable seal ring 22 and a central seal ring 24. The rotatable seal ring 22 surrounds a shaft sleeve 26 which is keyed to the shaft 12 by a key 28 in keyways 30, 32, and is keyed by a key 34, received in keyways 36 and 38 in the seal ring 22 and in a rotating face body 40, respectively. A resilient U-cup 42 is located in a cavity 44 in the body 40. A U-cup follower 46 engages the U-cup 42 and is resiliently urged towards the U-cup 42 by a plurality of springs 48 received in the spring pockets 50 in a spring holder 52 surrounding the shaft sleeve and surrounded by a portion of the U-cup follower 46. The springs 48 thus urge the seal ring 22 toward the central ring 24. The central seal ring has opposed faces 54 and 56 engaging seal faces 58 and 60 of the seal rings 16 and 22, respectively. The outer periphery of the central ring 24 is contained within the flanged ring 18 and a portion 62 of the ring 18 acts as a bearing for the ring 24.

The faces 58 and 60 of the seal ring 16 and 22 can be titanium carbide, tungsten carbide, stellite, aluminum oxide and the like; the central seal ring 24 can be made of carbon while the portion 62 of the flanged ring 18 can be surfaced with the same material as are the seal faces 58 and 60.

Figure 3:
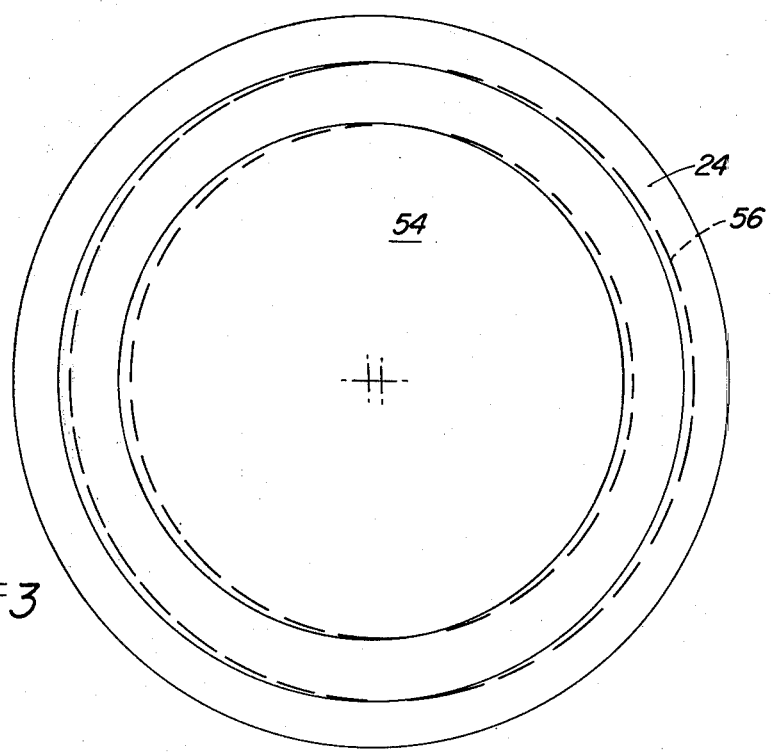
FIG. 3 is a face view of a sealing face of the central ring showing the spaced face in broken lines.

The seal faces 54 and 56 are eccentric to the seal faces 58 and 60, respectively, and are also eccentric to one another, as illustrated in FIG. 3 of the drawings.

Figure 2:
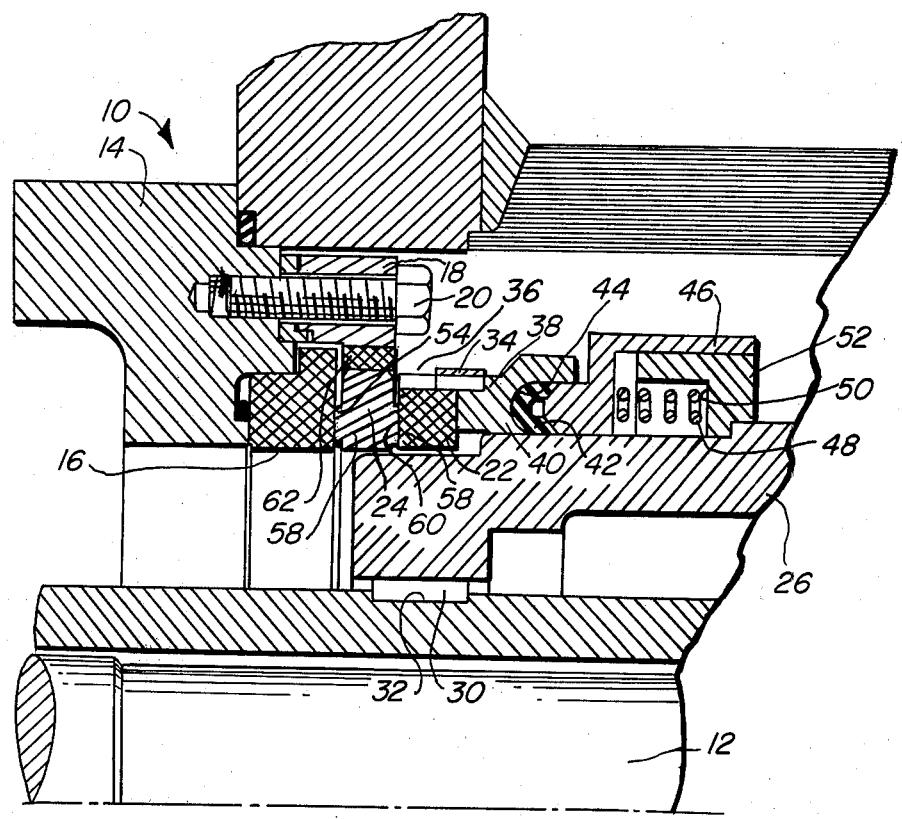
FIG. 2 is a sectional view of a second embodiment of the invention.

A second embodiment of the invention is illustrated in FIG. 2. The arrangement of parts is the same as in the FIG. 1 embodiment and the same reference characters are used. The main difference is in the materials used for the seal rings 16, 22, and 24 and the bearing surface 62. In this embodiment the seal rings 16 and 22 and the bearing surface 62 are made of carbon or carbon-like material while the central seal ring 24 or at least the faces 54, 56 thereof are made of titanium carbide, tungsten carbide, stellite, aluminum oxide and the like.

The drive system for the right hand portion of the seal (as viewed in the drawings) is the same as described in applicant's U.S. Pat. No. 3,858,890, granted Jan. 7, 1975. In that this drive system forms no part of the present invention, the parts, while shown, are not described in detail.

The seal of this invention has two sets of wearing surfaces which are provided by the engaging seal faces. The central of intermediate seal ring is free to operate as a stationary ring or a rotating ring depending on the differential friction at a seal face thereof. In other words, the seal of the central ring will operate on one contact surface or the other depending on which one has the lowest coefficient of friction at that time; as that contact surface wears and its coefficient of friction increases, the seal will then run on the other face or contact surface. Each time the seal is started and stopped, it will alternate from one wearing surface to the other; having two sets of wearing surfaces increases the seal life. The operation of alternating wear surfaces is enhanced by the surfaces of the central seal ring being eccentric to its engaging surface and also to the other.

In testing a seal constructed according to this invention, it has been observed that when standing still, the seal permits some slight leakage across the seal faces. Thus, a fluid film exists between seal faces. Therefore, starting torque for this seal is of a low value.

I claim:

1. In a mechanical seal assembly adapted to be associated with a rotatable shaft and a housing having a rotatable seal ring, a stationary seal ring and a central seal ring between the stationary and rotatable seal rings, the central seal ring having spaced faces which engage respectively a face of the stationary seal ring and the rotatable seal ring, the central seal ring being centered in a peripheral bearing therefor, the improvement which comprises:

one seal face of one of said engaging seal faces being eccentric to the other engaging seal face.

2. In a mechanical seal assembly as in claim 1, said seal faces of said central seal ring being eccentric to the respective seal faces of said engaging seal faces of said stationary and rotatable seal rings.

3. In a mechanical seal assembly as in claim 2, further comprising said seal faces of said central seal ring being eccentric to one another.

* * * * *